Figure 1:
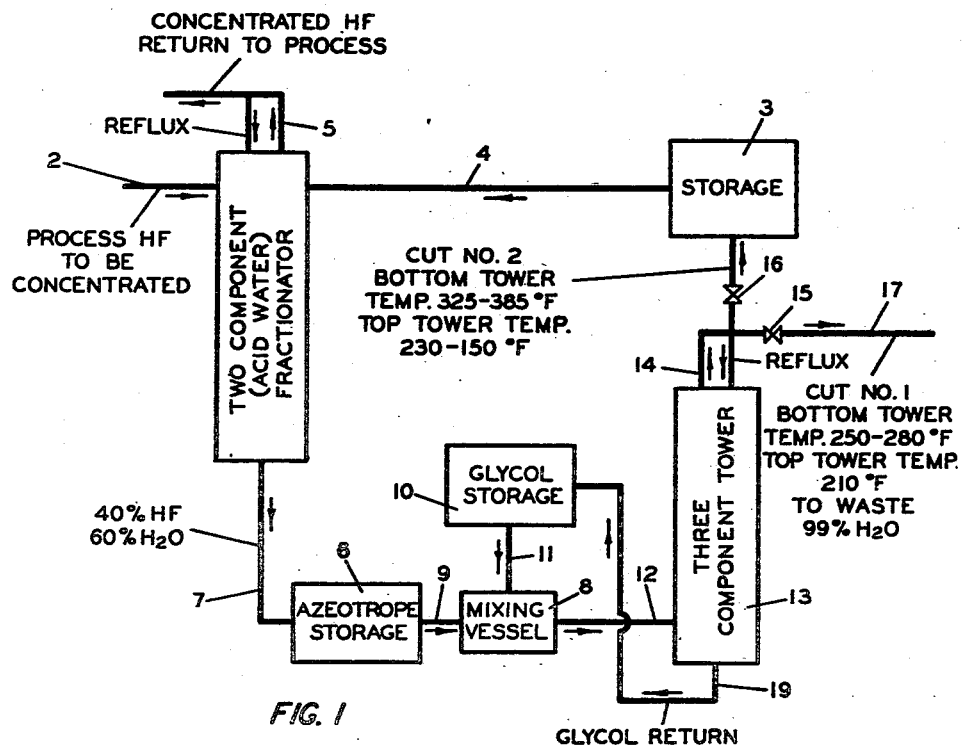

Patented Dec. 24, 1946

2,413,205

UNITED STATES PATENT OFFICE 2,413,205

DEHYDRATION OF HYDROHALOGEN ACID BY DISTILLATION

James Cole Word, Jr., and John J. Sims, Phillips, Tex., assignors to Phillips Petroleum Company, a corporation of Delaware Application April 17, 1943, Serial No. 483,524

11 Claims. (Cl. 202—57)

The present invention relates particularly to a process of recovering hydrofluoric acid or hydrogen fluoride in substantially pure and concentrated form from dilute or constant-boiling aqueous solutions of hydrofluoric acid. The process of the present invention is more generally applicable to the concentration of other hydrohalogen acids or hydrogen halides which form constant-boiling azeotropic mixtures with water.

The primary object of the present invention is to provide a method of recovering and concentrating aqueous solutions of hydrofluoric acid and other hydrohalogen acids which form constant-boiling azeotropic solutions.

Another object of the invention is to provide a continuous process of recovering and concentrating aqueous solutions of hydrofluoric acid and other hydrohalogen acids which form constant-boiling azeotropic solutions.

Other objects and advantages of the invention, some of which are specifically referred to hereinafter, will be apparent to those skilled in the art.

Hydrofluoric acid or hydrogen fluoride is a material which has recently become of increasing economic importance. Its use as an alkylation catalyst in the production of aviation motor fuel of high-octane rating is one of its more important recent uses. When used as a catalyst in alkylation and other reactions the problem of recovering and concentrating it for reuse has not been simple. Heretofore a substantial portion has been allowed to go to waste after being used in such manner because of the difficulties encountered in the recovery and concentration.

Methods have been described for the production of anhydrous hydrogen fluoride and concentration of aqueous solutions of hydrofluoric acid (see, for example, Calcott et al., Patent No. 2,018,397). None of these has met with much favor, however, for one reason or another. Some, for example, require rather careful control for successful operation.

Hydrofluoric acid forms a constant-boiling mixture with water which contains approximately 36% to 40% hydrogen fluoride and has a boiling point of approximately 120° C. at atmospheric pressure. The constant-boiling azeotropic mixture was reported by C. W. Muehlberger, J. Phys. Chem., 1928, vol. 32, page 1888, to contain 38.13% hydrogen fluoride at a pressure of 735 mm. of mercury and to have a boiling point of 110.8° C. at a pressure of 732 mm. The composition of the constant-boiling acid, its density and its boiling point vary with the pressure prevailing during distillation, as is well understood. The composition of other constant-boiling hydrogen halide solutions is different from that of hydrogen fluoride (constant-boiling hydrochloric acid containing approximately 20% hydrogen chloride) and vary in the same way with pressure.

We have discovered that aqueous solutions of hydrofluoric acid can be readily recovered and concentrated by simple distillation procedures by adding to such solutions a third component typified by ethylene glycol. Such a third component added to the azeotropic mixture appears to break up the azeotrope by associating with the hydrogen fluoride. The association complex with the third component can thereafter be dissociated into its components. It is possible to effect the separation of such mixtures into two components by distillation by the use of such a third component, to yield a fraction rich in hydrogen fluoride and a fraction poorer in hydrogen fluoride. By conducting the distillation as more specifically described hereinafter, a fraction richer in hydrogen fluoride than is contained in constant-boiling hydrofluoric acid may be obtained.

In one specific illustrative embodiment of the invention, ethylene glycol is added to one-half its volume of a constant-boiling aqueous solution of hydrofluoric acid. The mixture is then heated gradually in a distillation apparatus to approximately 280° F., whereupon approximately two-thirds of the original water present in the azeotropic constant-boiling solution distills. Less than approximately 1% of hydrofluoric acid appears in the condensate of such distillation. The residue is then subjected to distillation at a higher temperature, namely, from approximately 325° (163° C.) to approximately 385° F. (196° C.). The condensate consists of the greater portion of the hydrofluoric acid together with the residual water and is an aqueous solution containing approximately 60% hydrogen fluoride. The residue consists of substantially pure ethylene glycol which may be used in subsequent distillations. The concentrated (60%) hydrofluoric acid solution may be subjected to distillation (without the addition of a third component) to yield a distillate consisting of substantially pure (90% to 95%) hydrogen fluoride and a residue consisting of constant-boiling hydrofluoric acid containing approximately 40% hydrogen fluoride.

As is well known, the distillation of mixtures of hydrofluoric acid or hydrogen fluoride and water which are weaker in hydrogen fluoride than the constant-boiling mixture yields a distillate which is substantially water vapor together with small proportions of hydrofluoric acid until the composition of the residue of the distillation approaches or is equal to that of the constant-boiling mixture, whereupon the constant-boiling mixture distills. On the other hand, when mixtures of hydrogen fluoride and water which contain more hydrogen fluoride than the constant-boiling mixture are distilled, the distillate consists of substantially pure hydrogen fluoride together with small proportions of water vapor until the composition of the residue of the distillation approaches or is equal to that of the constant-boiling mixture, whereupon the constant-boiling mixture distills. Distillation of the constant-boiling mixture normally yields a distillate consisting of constant-boiling hydrofluoric acid solution.

The invention is particularly useful, as is obvious, for the concentration or resolution of constant-boiling mixtures of hydrofluoric acid, but is also useful for the resolution of weaker solutions of hydrofluoric acid since it removes hydrogen fluoride from the distillate which might otherwise pass over with water, the principal component of the distillate.

Ethylene glycol, which is the preferred third component for use in the process of our invention, appears to associate with hydrogen fluoride to form a chemical complex or loosely bonded chemical compound which is much more stable than the association between hydrogen fluoride and water. The nature of the various combinations existing in the system is not clearly understood, hence the invention is not be limited by any theories which might be proposed to explain the peculiar and unexpected results obtained in the practice of the invention. The complex of ethylene glycol and hydrogen fluoride, which is the term adopted herein by us to refer to the association, is relatively stable at 300° F. (149° C.) and below 325° F. (163° C.); at higher temperatures it decomposes or dissociates readily into its constituent parts, and at about 385° F. (196° C.) is substantially completely decomposed or dissociated. The exact temperature at which the initial decomposition starts will vary with pressure and with glycol/hydrogen fluoride molecular ratios, but will usually be below 325° F.

In using ethylene glycol as the third component according to my invention, the proportions which are to be used may vary widely. Generally, 2¼ parts by volume of ethylene glycol to one part by volume of constant-boiling hydrofluoric acid is preferred. This is equivalent to approximately 6 parts by weight of ethylene glycol to 1 part by weight of hydrogen fluoride or in the proportion of approximately 2 mols of ethylene glycol to 1 mol of hydrogen fluoride. However, equal parts by volume of ethylene glycol to constant-boiling hydrofluoric acid up to four volumes or more of ethylene glycol to each volume of constant-boiling acid may be used to effect a separation into two portions, one weaker and one stronger in hydrofluoric acid than the constant-boiling solution. But at least two volumes of ethylene glycol to one of constant-boiling hydrofluoric acid solution must be used to effect a clean separation of the first two-thirds of water present. When acids less concentrated or more concentrated than the constant-boiling solution of hydrofluoric acid are to be treated according to the invention the amount of ethylene glycol to add to the distillation mixture may be estimated approximately on the basis of the hydrogen fluoride content of the solution. There is some small loss of ethylene glycol in the process, which increases in amount as the ratio of ethylene glycol to hydrogen fluoride in the process increases. When mol for mol ratios of glycol and hydrogen fluoride are present, the loss is substantially negligible but when four mols of glycol to each mol of hydrogen fluoride are present, the loss may be as high as 2 or 3%.

The presence of impurities is in general not detrimental to the distillation procedure of the invention. As normally practiced the invention will be applied to previously distilled acid of approximately constant-boiling characteristics. The presence of small amounts of hydrocarbons, for example, in such mixtures, or of other substantially inert substances, is without substantial effect.

Instead of ethylene glycol, other water-soluble substances may be used which form water-soluble stable complexes with hydrofloric acid that are not substantially decomposed or dissociated at 100° C. or at the boiling temperature of water at a desired pressure and that readily dissociate substantially completely to liberate hydrogen fluoride at a higher temperature but below approximately 250° C. Diethylene glycol, polyethylene glycols, propylene glycol, polyhydric alcohols in general and the like, for example, are substances of this nature, which may be used to replace, partially or completely, ethylene glycol. Preferred substances are those which have higher boiling points than the dissociation point of the complex. Monohydric alcohols will not serve for this purpose.

By the use of the method of this invention in the concentration of constant-boiling hydrofluoric acid, approximately two-thirds of the water present is removed by simple distillation as distillate. The distillate is a very weak acid solution which contains less than approximately 1% hydrogen fluoride and can be readily disposed of, presenting no waste-disposal problem in this respect, or it may be recovered, if justified by economics. Substantially all of the remaining one-third of the water originally present in the constant-boiling hydrofluoric acid can be removed readily by additional distillation (in the absence of the third component) or by recycle. The process provides hydrofluoric acid having an average content of approximately 60% hydrogen fluoride by one simple distillation or 90 to 95% acid by subjecting the 60% acid to simple two-component distillation. The residue of the distillation of 60% acid is constant-boiling acid (approximately 40% hydrogen fluoride) which can be recovered by recycling.

Although the invention is directed particularly to the recovery and concentration of hydrofluoric acid, it may be used to effect recovery and concentration of other hydrohalogen acids or hydrogen halides which form constant-boiling mixtures with water, for example, hydrochloric acid, hydrobromic acid and hydroiodic acid.

Preferred methods of practicing my invention by using ethylene glycol as the third component in the distillation process are illustrated in the examples which follow hereinafter. The processes are described in the examples in greater detail and in connection with the accompanying drawing which represents flow sheets of the processes.

*Example I.—Batch process*

Into a fractionator, represented as 1 on Figure 1 of the accompanying drawing, is introduced through conduit or line 2, hydrofluoric acid which is to be concentrated. This hydrofluoric acid is normally constant-boiling (40% or thereabout) hydrofluoric acid, which may be distillate from a prior separation or segregation operation, but may be less concentrated or more concentrated than this. If it is less concentrated than constant-boiling acid, sufficient acid of greater concentration should be added to bring it to or above constant-boiling acid concentration. To this fractionator may also be introduced 60% hydrofluoric acid from storage tank 3 through conduit or line 4, for the purpose of bringing the acid already present to constant-boiling acid concentration or to recover hydrogen fluoride from the added acid. The fractionator is operated at such a temperature range that the distillate consists of substantially pure hydrogen fluoride, which passes from the fractionator through line 5, and the residue consists of constant-boiling hydrofluoric acid solution whose composition is substantially 40% hydrogen fluoride and 60% water. The distillation is preferably conducted at atmospheric pressure or at not substantially greater than a total pressure of about two atmospheres. However, it may be conducted at other suitable pressures, either lower or higher than these, in which event the composition of the residue or constant-boiling hydrofluoric acid solution will be somewhat different.

The residue of the fractionator 1 or constant-boiling hydrofluoric acid solution is then discharged to an azeotrope storage tank 6 through conduit 7. From azeotrope storage 6, the constant-boiling hydrofluoric acid solution is removed to a mixing vessel 8 through line 9 where it is mixed with a suitable amount of ethylene glycol from a storage tank 10, discharging into mixing vessel 8 through line 11. The amount of glycol which is added to the constant-boiling hydrofluoric acid solution in mixing vessel 8 is preferably 2¼ volumes of glycol to each volume of acid. The mixing in mixing vessel 8 may be effected by stirring or by other conventional means. The mixed acid-glycol mixture is then discharged through line 12 into a fractionator or three-component tower 13, which is a conventional fractionator or other suitable distillation tower in which the temperatures may be readily varied so that bottom temperatures ranging as high as 400° F. or more can be obtained.

In the three-component tower 13, a separation is made into two fractions, as follows:

I. Fraction or cut No. 1 which is obtained while the top of the tower or column is maintained at a temperature slightly above the boiling point of water at the prevailing pressure (about 210° F. when the pressure is approximately 5 to 10 pounds per square inch greater than atmospheric pressure) and the temperature at the bottom of the tower is raised gradually from about 250° to some point below approximately 325° F. This fraction consists essentially of water with small traces (less than about 1%) of hydrogen fluoride. The end point of this cut is detected by a sharp rise in top tower temperature from the boiling point of water to approximately 230° F.

II. Fraction or cut No. 2 which is obtained while the temperature of the bottom of the column or tower is raised from approximately 325° to approximately 385° F. The temperatures at the top of the column during distillation will decrease gradually from approximately 230° to approximately 150° F., this decreasing temperature indicating that greater decomposition of the complex of hydrogen fluoride and ethylene glycol is being engendered and that the composition of the distillate is increasing in proportion of hydrogen fluoride and decreasing in proportion of water. This fraction as collected batchwise consists of approximately 60% hydrofluoric acid.

These cuts are collected separately. In Figure 1 they are represented as being drawn off as distillate through line 14, and then, by suitable adjustment of valves 15 and 16, cut No. 1 is removed through line 17 and cut No. 2 is removed through line 18 and sent to storage tank or vessel 3. Cut No. 2, which consists of concentrated (60%) hydrofluoric acid solution, is then subjected to further concentration by being charged to two-component fractionator 1, from which the distillate is substantially pure hydrogen fluoride.

Ethylene glycol, which is the residue in three-component tower 13 after cut No. 2 has been removed, is discharged from the tower and returned to glycol storage tank 10 through line 19.

*Example II.—Alternative batch process*

An alternative batch process is operated substantially as described in Example I, except that the acid charged, that is, the process hydrofluoric acid which is to be concentrated, is weaker than constant-boiling hydrofluoric acid solution. The two-component fractionator 1 of Figure 1, is operated in such a manner that the distillate carried off by line 5 is predominantly water and the distillation is carried to such point that the residue consists of constant-boiling hydrofluoric acid.

This alternative is less preferable, however, than that described in Example I, in which sufficient acid from an exterior source or from storage tank 3 is added to bring the concentration of the acid to that of constant-boiling acid so that the distillate at all times is more concentrated than constant-boiling acid.

*Example III.—Continuous process*

Figure 2:
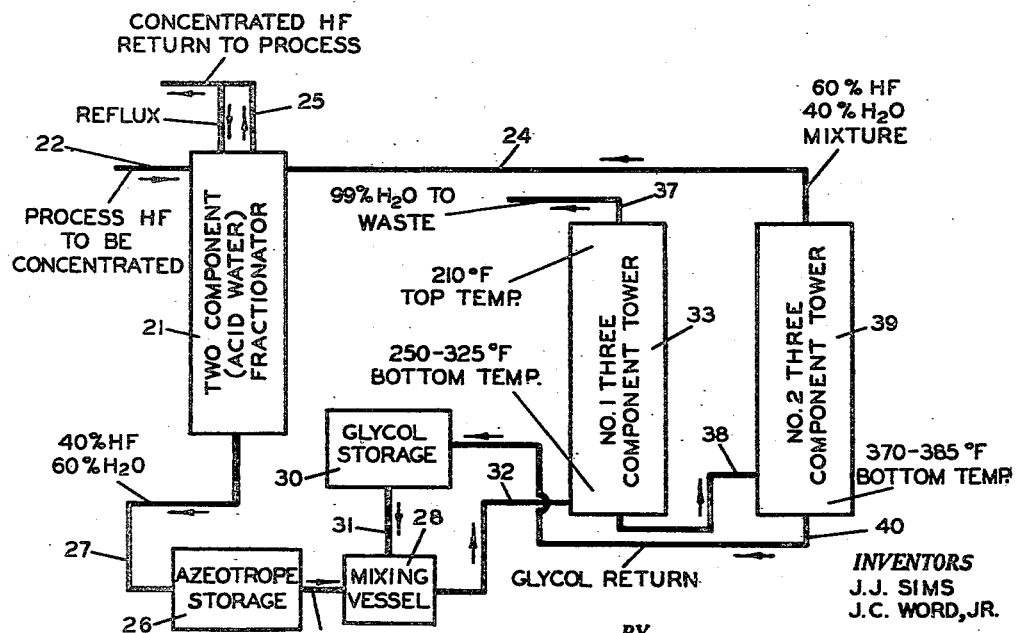

A flow sheet of a continuous process of concentrating hydrofluoric acid according to the invention is represented in Figure 2. This continuous operation is conducted as follows:

The hydrofluoric acid to be concentrated is charged continuously at a predetermined rate to a two-component (acid-water) fractionator 21 through line 22. This fractionator is operated in much the same manner as the corresponding fractionator 1 in the batch process of Example I. Substantially pure hydrogen fluoride or hydrofluoric acid is distilled through line 25 and the residue, which consists of constant-boiling acid, is discharged continuously to an azeotrope storage tank 26. The acid from the azeotrope storage tank 26 and glycol from the glycol storage tank 30 are charged at respectively predetermined rates to mixing vessel 28 which in turn discharges the glycol-acid mixture at a continuous predetermined rate to the first (No. 1) of a series of two fractionating (three-component) towers similar to the three-component tower 13 of Figure 1. In this first three-component tower 33, the top temperature is maintained at approximately the boiling point of water at the pressure prevailing at the top of the tower (210° F. approximately at pressures slightly above atmospheric) while the bottom temperature is maintained within the range of approximately 250° to 325° F., the exact temperature depending upon the molecular ratio of glycol to hydrogen fluoride and on the pressure. The distillate, which corresponds to cut No. 1 of the batch operation of Example I, consists essentially of water together with a small proportion of hydrogen fluoride, and is discharged through line 37 and discarded. The residue or bottoms is discharged continuously at a predetermined rate through line 38 into No. 2 three-component tower 39.

In No. 2 three-component tower 39 the temperature at the bottom is approximately 370° to 385° F. The overhead or distillate, which consists of approximately 60% hydrofluoric acid, is discharged through line 24 and is recycled through the process, being mixed with hydrofluoric acid to be concentrated in two-component (acid-water) fractionator 21. The residue of No. 2 three-component tower 39, which consists of substantially pure ethylene glycol, is discharged continuously through line 40 to glycol storage tank 30. Glycol is supplied occasionally to glycol storage tank 30 to compensate for any that is lost in the process.

Although the foregoing examples illustrate preferred methods of practicing the invention, in which ethylene glycol is used as the third-component of the distillation procedures, it is obvious that the processes can be varied or modified by changes of distillation temperatures and the like to adapt them to the use of other substances which have been specified hereinbefore as alternative third components. Likewise, the processes may be varied in obvious manner to adopt them to the recovery and concentration of other hydrogen halides or hydrohalogen acids.

Hydrofluoric acid attacks glass, rubber, and metals readily. The anhydrous acid is much less corrosive to metals than dilute acids and has very little effect on iron. Concentrated hydrofluoric acid can be stored and shipped in ordinary welded steel tanks if precautions are taken to insure that the steel is free from oxide coatings, which are relatively easily attacked. Bronze and noble metals are much more resistant to hydrofluoric acid than iron. In choosing a material from which to construct suitable apparatus for the practice of the present invention, attention should be given to these factors. Bronze is preferred as a construction material for parts such as valves, compressor cylinders, pistons and the like. Asbestos may be used as a packing material for joints, etc. Lubrication of moving parts of the apparatus may be provided by means of dry petroleum lubricating oils which are resistant to attack by the acid. The mention of these materials does not, however, exclude the use of other materials equally as or better suited for the respective purposes.

Inasmuch as the foregoing description comprises preferred embodiments of the invention it is to be understood that these are merely exemplary and that variations and modifications may be made therein without departing substantially from the invention, and that the invention is not limited to these preferred embodiments but solely by the appended claims.

We claim:

1. The process of concentrating an essentially aqueous solution of a hydrogen halide by distillation, which comprises the addition to said solution of ethylene glycol, which forms a complex with the hydrogen halide, heating said solution containing the complex at a temperature above the boiling point of water but below the temperature at which substantial dissociation of the complex occurs, to drive out water therefrom, and thereafter distilling the partially water-freed residue at a temperature within the dissociation range of the complex to obtain the hydrogen halide in more concentrated form as distillate and ethylene glycol as residue.

2. The process of concentrating an essentially aqueous solution of hydrogen fluoride by distillation, which comprises the addition to said solution of ethylene glycol, which forms a complex with hydrogen fluoride, heating said solution containing the complex at a temperature above the boiling point of water but below the temperature at which substantial dissociation of the complex occurs, to drive out water therefrom, and thereafter distilling the partially water-freed residue at a temperature within the dissociation range of the complex to obtain hydrogen fluoride in more concentrated form as distillate and ethylene glycol as residue.

3. The process of concentrating an essentially aqueous solution of hydrogen fluoride by distillation, which comprises the addition to said solution of diethylene glycol, which forms a complex with hydrogen fluoride, heating said solution containing the complex at a temperature above the boiling point of water but below the temperature at which substantial dissociation of the complex occurs, to drive out water therefrom, and thereafter distilling the partially water-freed residue at a temperature within the dissociation range of the complex to obtain hydrogen fluoride in more concentrated form as distillate and diethylene glycol as residue.

4. The process of concentrating an essentially aqueous solution of hydrogen fluoride by distillation, which comprises the addition to said solution of propylene glycol, which forms a complex with hydrogen fluoride, heating said solution containing the complex at a temperature above the boiling point of water but below the temperature at which substantial dissociation of the complex occurs, to drive out water therefrom, and thereafter distilling the partially water-freed residue at a temperature within the dissociation range of the complex to obtain hydrogen fluoride in more concentrated form as distillate and propylene glycol as residue.

5. The process of concentrating by distillation hydrofluoric acid of approximately constant-boiling concentration, which comprises the addition to said hydrofluoric acid of approximately two to four parts by volume of ethylene glycol to one part constant-boiling acid, heating said solution at a temperature above the boiling point of water but below approximately 325° F., to drive out approximately two-thirds the water contained therein, and thereafter distilling the partially water-freed residue at a temperature within the range of 325° to 385° F. to obtain hydrofluoric acid of approximately 60% concentration as distillate and substantially pure ethylene glycol as residue.

6. The process as defined in claim 5 and further characterized in that the hydrofluoric acid of approximately 60% concentration is further concentrated by distillation to yield hydrofluoric acid of at least approximately 90% concentration as distillate and approximately constant-boiling hydrofluoric acid as residue.

7. The continuous process of concentrating, by distillation, hydrofluoric acid of approximately constant-boiling concentration, which comprises the continuous addition to a mixture of said acid and ethylene glycol, of ethylene glycol and said acid in substantially constant predetermined amounts, continuously withdrawing a portion of said mixture of acid and glycol and charging it to a first fractionator operating at a bottom temperature within the range of approximately 250° F. to 325° F., continuously withdrawing the distillate, which consists essentially of water, from said first fractionator and withdrawing it from the cycle, continuously withdrawing a portion of the residue of said first fractionator and continuously passing it to a second fractionator operating at a bottom temperature within the range of approximately 370° to 385° F., continuously withdrawing a portion of the residue from said second fractionator, which consists of substantially pure ethylene glycol, and charging it to the mixture of acid and glycol in the cycle, continuously passing the distillate, which consists of hydrofluoric acid of approximately 60% concentration, to a third fractionator containing freshly charged constant-boiling acid to be concentrated that is operating at about the boiling temperature of constant-boiling acid, withdrawing the distillate from said third fractionator, which consists of hydrofluoric acid of at least approximately 90% concentration, and withdrawing it from the cycle, and charging the residue of approximately constant-boiling acid to the mixture of acid and glycol in the cycle.

8. The process of concentrating an essentially aqueous solution of a hydrogen halide by distillation, which comprises the addition to said solution of a polyhydric alcohol which forms a water-soluble complex with the hydrogen halide, which complex is substantially stable at a temperature of approximately 100° C. and readily dissociates substantially completely into the hydrogen halide and the polyhydric alcohol at a higher temperature but below approximately 250° C. and below the boiling point of said polyhydric alcohol, in such amount that substantially all the hydrogen halide in the aqueous solution is bound in the form of the complex with the polyhydric alcohol, heating said solution containing the complex at a temperature above the boiling point of water but below the temperature at which substantial dissociation of the complex occurs, to drive out water substantially free from the hydrogen halide therefrom, and thereafter distilling the partially water-freed residue at a temperature above the dissociation point of the complex but below the boiling point of the polyhydric alcohol to obtain the hydrogen halide in more concentrated form as distillate and the polyhydric alcohol as residue.

9. The process of concentrating an essentially aqueous solution of hydrogen fluoride by distillation, which comprises the addition to said solution of a polyhydric alcohol which forms a water-soluble complex with hydrogen fluoride, which complex is substantially stable at a temperature of approximately 100° C. and readily dissociates substantially completely into hydrogen fluoride and the polyhydric alcohol at a higher temperature but below approximately 250° C. and below the boiling point of said polyhydric alcohol, in such amount that substantially all the hydrogen fluoride in the aqueous solution is bound in the form of the complex with the polyhydric alcohol, heating said solution containing the complex at a temperature above the boiling point of water but below the temperature at which substantial dissociation of the complex occurs, to drive out water substantially free from hydrogen fluoride therefrom, and thereafter distilling the partially water-freed residue at a temperature above the dissociation point of the complex but below the boiling point of the polyhydric alcohol to obtain hydrogen fluoride in more concentrated form as distillate and the polyhydric alcohol as residue.

10. The process of concentrating an essentially aqueous solution of a hydrogen halide by distillation, which comprises the addition to said solution of diethylene glycol, which forms a complex with the hydrogen halide, heating said solution containing the complex at a temperature above the boiling point of water but below the temperature at which substantial dissociation of the complex occurs, to drive out water therefrom, and thereafter distilling the partially water-freed residue at a temperature within the dissociation range of the complex to obtain the hydrogen halide in more concentrated form as distillate and diethylene glycol as residue.

11. The process of concentrating an essentially aqueous solution of a hydrogen halide by distillation, which comprises the addition to said solution of propylene glycol, which forms a complex with the hydrogen halide, heating said solution containing the complex at a temperature above the boiling point of water but below the temperature at which substantial dissociation of the complex occurs, to drive out water therefrom, and thereafter distilling the partially water-freed residue at a temperature within the dissociation range of the complex to obtain the hydrogen halide in more concentrated form as distillate and propylene glycol as residue.

JAMES COLE WORD, JR.
JOHN J. SIMS.